US009033435B2

(12) United States Patent
Gasser

(10) Patent No.: US 9,033,435 B2
(45) Date of Patent: May 19, 2015

(54) CONNECTING APPARATUS FOR CONNECTING TWO DRAWER WALL PARTS WHICH ARE INTENDED TO BE ARRANGED AT A RIGHT ANGLE

(71) Applicant: Julius Blum GmbH, Hoechst (AT)

(72) Inventor: Ingo Gasser, Hoechst (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 14/211,676

(22) Filed: Mar. 14, 2014

(65) Prior Publication Data

US 2014/0197724 A1  Jul. 17, 2014

Related U.S. Application Data

(63) Continuation of application No. PCT/AT2012/000231, filed on Sep. 7, 2012.

(30) Foreign Application Priority Data

Oct. 17, 2011  (AT) ................... A 1513/2011

(51) Int. Cl.
*A47B 88/00* (2006.01)
*F16B 12/46* (2006.01)

(52) U.S. Cl.
CPC ............. *A47B 88/0014* (2013.01); *F16B 12/46* (2013.01); *A47B 2088/0037* (2013.01)

(58) Field of Classification Search
CPC ........... A47B 88/0014; A47B 88/0051; A47B 2088/0037; A47B 2210/09; F16B 12/02; F16B 12/20; F16B 12/46

USPC ............ 312/330.1, 348.1, 348.2, 348.4, 263, 312/111; 403/403, 409.1
See application file for complete search history.

(56) References Cited

U.S. PATENT DOCUMENTS 3,876,270 A * 4/1975 White ..................... 312/348.1
4,042,288 A * 8/1977 Litchfield ................ 312/348.2
(Continued)

FOREIGN PATENT DOCUMENTS

CA       1107340      8/1981
DE       27 15 830    10/1977
(Continued)

OTHER PUBLICATIONS

International Search Report (ISR) issued Nov. 30, 2012 in International (PCT) Application No. PCT/AT2012/000231.
(Continued)

*Primary Examiner* — James O Hansen
(74) *Attorney, Agent, or Firm* — Wenderoth, Lind & Ponack, L.L.P.

(57) ABSTRACT

A connecting apparatus for connecting two drawer wall parts which are intended to be arranged at a right angle includes at least one receiving part which has a receiving opening for receiving an end section of a first drawer wall part and has at least one insertion opening, a bracket which has at least two limbs which run substantially parallel, wherein the bracket can be pushed onto a web, which is arranged or formed on a second drawer wall part, in order to connect the first drawer wall part and the second drawer wall part, and wherein the at least two limbs of the bracket surround the web of the second drawer wall part, wherein a first limb of the bracket can be inserted into the insertion opening in the receiving part and connects the receiving part to the second drawer wall part in a positionally secure manner.

20 Claims, 6 Drawing Sheets

(56) References Cited

U.S. PATENT DOCUMENTS

| | | | | |
|---|---|---|---|---|
| 4,279,455 A | * | 7/1981 | Santo | 312/348.2 |
| 4,303,289 A | * | 12/1981 | Hardy | 312/348.2 |
| 5,213,403 A | * | 5/1993 | Lautenschlager | 312/348.2 |
| 5,678,909 A | * | 10/1997 | Cheng et al. | 312/348.2 |
| 2012/0133259 A1 | | 5/2012 | Babucke-Runte et al. | |

FOREIGN PATENT DOCUMENTS

| | | |
|---|---|---|
| DE | 20 2009 002 242 | 7/2010 |
| DE | 20 2009 004 982 | 11/2010 |
| EP | 0 540 791 | 5/1993 |
| GB | 1 522 598 | 8/1978 |
| WO | 2010/094532 | 8/2010 |

OTHER PUBLICATIONS

Austrian Office Action (OA) issued Sep. 6, 2012 in Austrian Patent Application No. A 1513/2011, together with English translation of relevant part thereof.

* cited by examiner

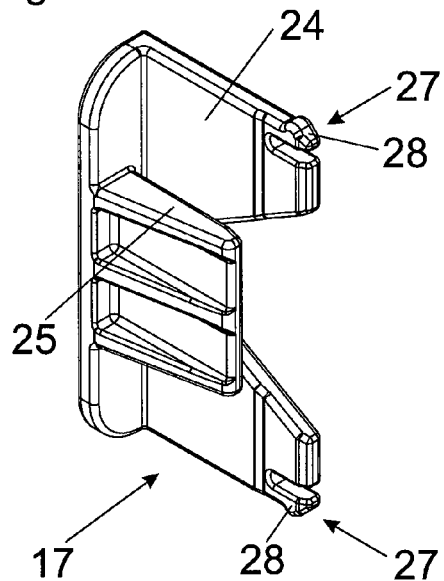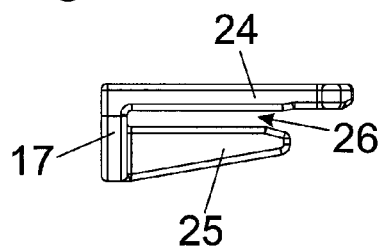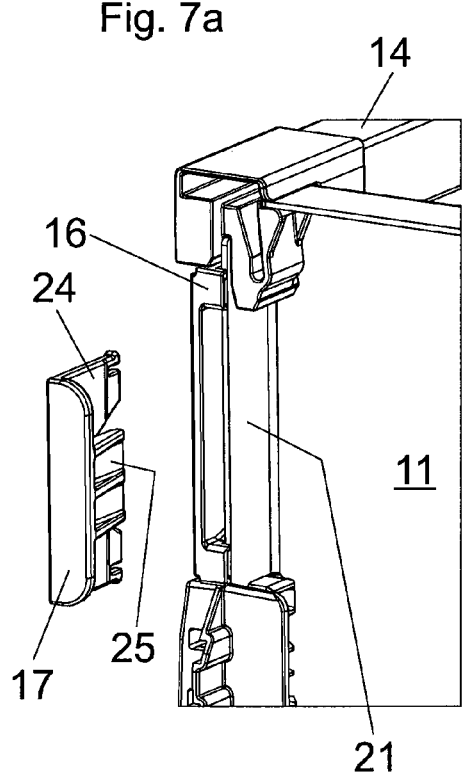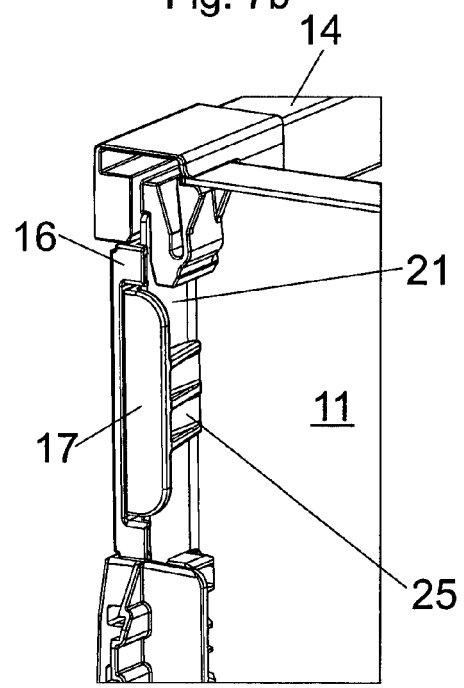

CONNECTING APPARATUS FOR CONNECTING TWO DRAWER WALL PARTS WHICH ARE INTENDED TO BE ARRANGED AT A RIGHT ANGLE

BACKGROUND OF THE INVENTION

The present invention concerns a connecting apparatus for connecting two drawer wall parts which are intended to be arranged at a right angle.

In addition the invention concerns an arrangement comprising at least two drawer wall parts which are to be arranged at a right angle and which are or can be connected together by way of such a connecting apparatus. The invention further concerns a drawer having a rear wall, a front wall and two side walls, wherein at least two of those walls can be or are connected together with a connecting apparatus of the kind to be described.

Such connecting apparatuses are used for the assembly of drawer wall parts, wherein it is particularly provided that a first drawer wall part is in the form of a decorative, plate-shaped insert—for example of glass, plastic, wood, stone or ceramic—which is to be connected by way of the connecting apparatus to a profile wall of metal or plastic. In general, it is desirable if assembly or dismantling of the drawer wall parts is easy to implement and it is possible to dispense with complex components for the connecting apparatus. Manual assembly or separation of connected drawer wall parts should also be capable of implementation without the use of a tool.

SUMMARY OF THE INVENTION

The object of the present invention is to propose a connecting apparatus of the general kind set forth in the opening part of this specification, which satisfies the above-mentioned requirements.

The connecting apparatus according to the invention for connecting two drawer wall parts which are to be arranged at a right angle comprises the combination of the following features:
- at least one receiving portion having a receiving opening for receiving an end portion of the first drawer wall part and at least one insertion opening, and
- a clip having at least two limbs extending substantially parallel, wherein the clip for connecting the two drawer wall parts can be pushed onto a web arranged or provided at the second drawer wall part and wherein the two limbs of the clip embrace the web of the second drawer wall part, wherein a first limb of the clip can be pushed into the insertion opening in the receiving portion and connects the receiving portion to the second drawer wall part in positionally secure relationship.

In other words, there is provided a receiving portion with a receiving opening into which an end portion of the first drawer wall part can be inserted. The U-shaped clip with the at least two limbs extending parallel serves for fixing the receiving portion to the second drawer wall part, wherein, in the assembly procedure, a limb of the clip is to be inserted into the provided insertion opening in the receiving portion and wherein the two limbs of the clips jointly embrace a web on the second drawer wall part so that the receiving portion (and therewith the first drawer wall part) can be fixed in positively locking and/or force-locking relationship relative to the web of the second drawer wall part.

According to an embodiment of the invention, it can be provided that the receiving opening of the receiving portion is in the form of a push-in pocket which, in the assembled condition, substantially completely embraces the end portion of the first drawer wall part. An end section of the first drawer wall part can be inserted into that insertion pocket.

To facilitate insertion of the clip into the insertion opening in the receiving portion, it can be provided that the receiving portion has at least one introduction funnel by way of which a limb of the clip can be guided into the insertion opening of the receiving portion. For that purpose, the introduction funnel can have at least one—and preferably two mutually converging—inclined surfaces by which at least one limb of the clip can be guided in the direction of the insertion opening in the receiving portion.

The receiving portion and/or the clip can be made of plastic, wherein it is preferably provided that those components are in the form of one-piece injection moldings. That permits easy and inexpensive manufacture of the receiving portion and/or of the clip. The drawer according to the invention has a rear wall, a front panel and two side walls, wherein at least two of those walls are connected together with a connecting apparatus of the kind in question. The rear wall, the front panel and/or at least one side wall can have a drawer wall part in the form of a plate-shaped insert, preferably of glass, plastic, wood, stone or ceramic, wherein the plate-shaped insert is connected by way of the connecting apparatus to a profile wall, preferably of metal or plastic.

BRIEF DESCRIPTION OF THE DRAWINGS

Further details and advantages of the present invention will be described by means of the embodiment by way of example illustrated in the drawings in which:

FIGS. 6a and 6b show two different views of the clip of the connecting apparatus, and FIGS. 7a and 7b show the rear end region of the drawer with the clip to be fitted in place and the assembly position of the clip.

DETAILED DESCRIPTION OF THE INVENTION

Figure 1:
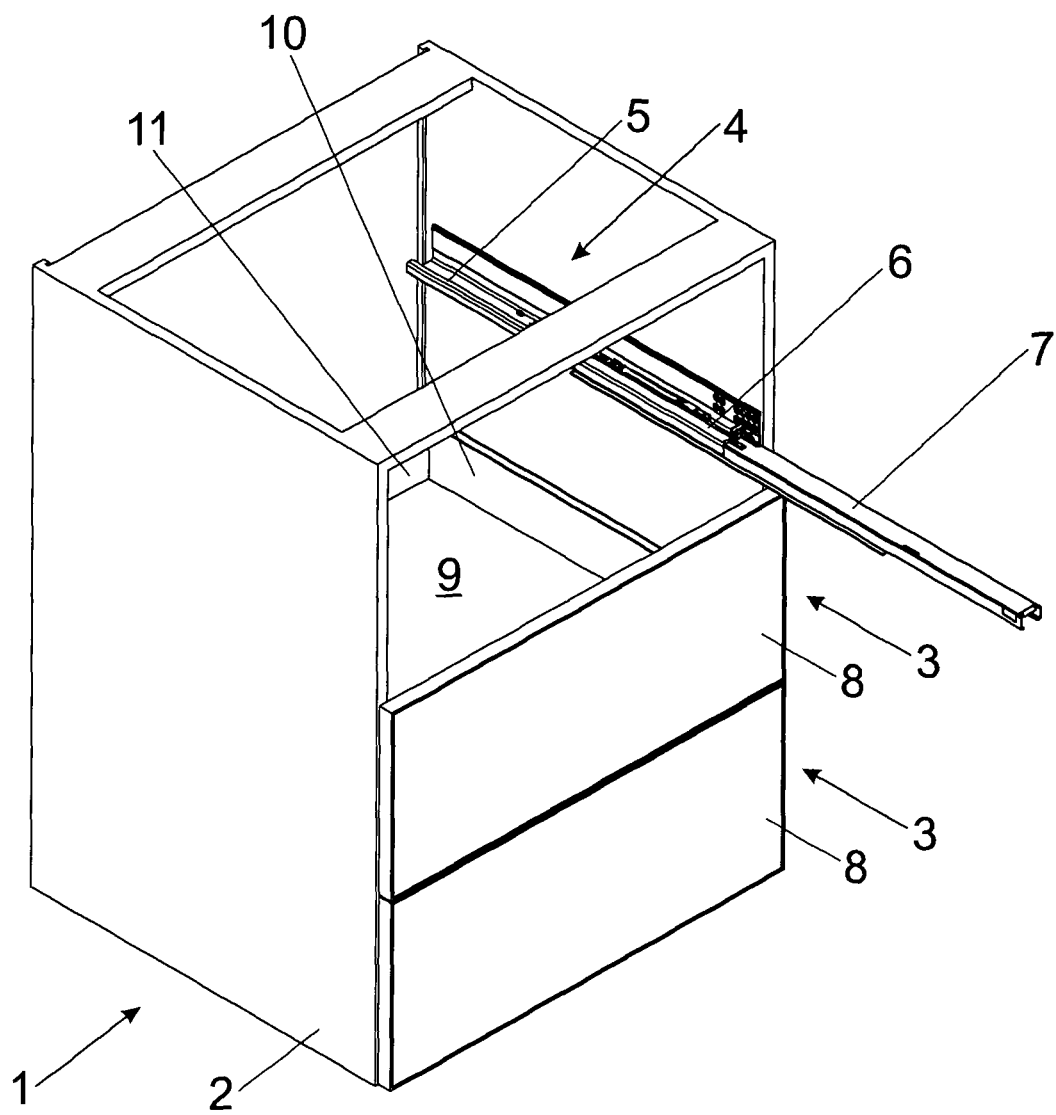
FIG. 1 shows a perspective view of an article of furniture comprising a furniture carcass and displaceable drawers.

FIG. 1 shows a perspective view of an article of furniture 1. The article of furniture 1 has a plurality of drawers 3 which are mounted displaceably relative to a furniture carcass 2 in cabinet form by way of drawer extension guides 4. In a known manner, the drawer extension guide 4 has a carcass rail 5 to be fixed to the furniture carcass 2, a drawer rail 7 to be fixed to the drawer 3 and a central rail 6 arranged displaceably between the carcass rail 5 and the drawer rail 7. The drawers 3 each have a front panel 8, a drawer bottom 9, drawer side walls 10 and a rear wall 11.

Figure 2:
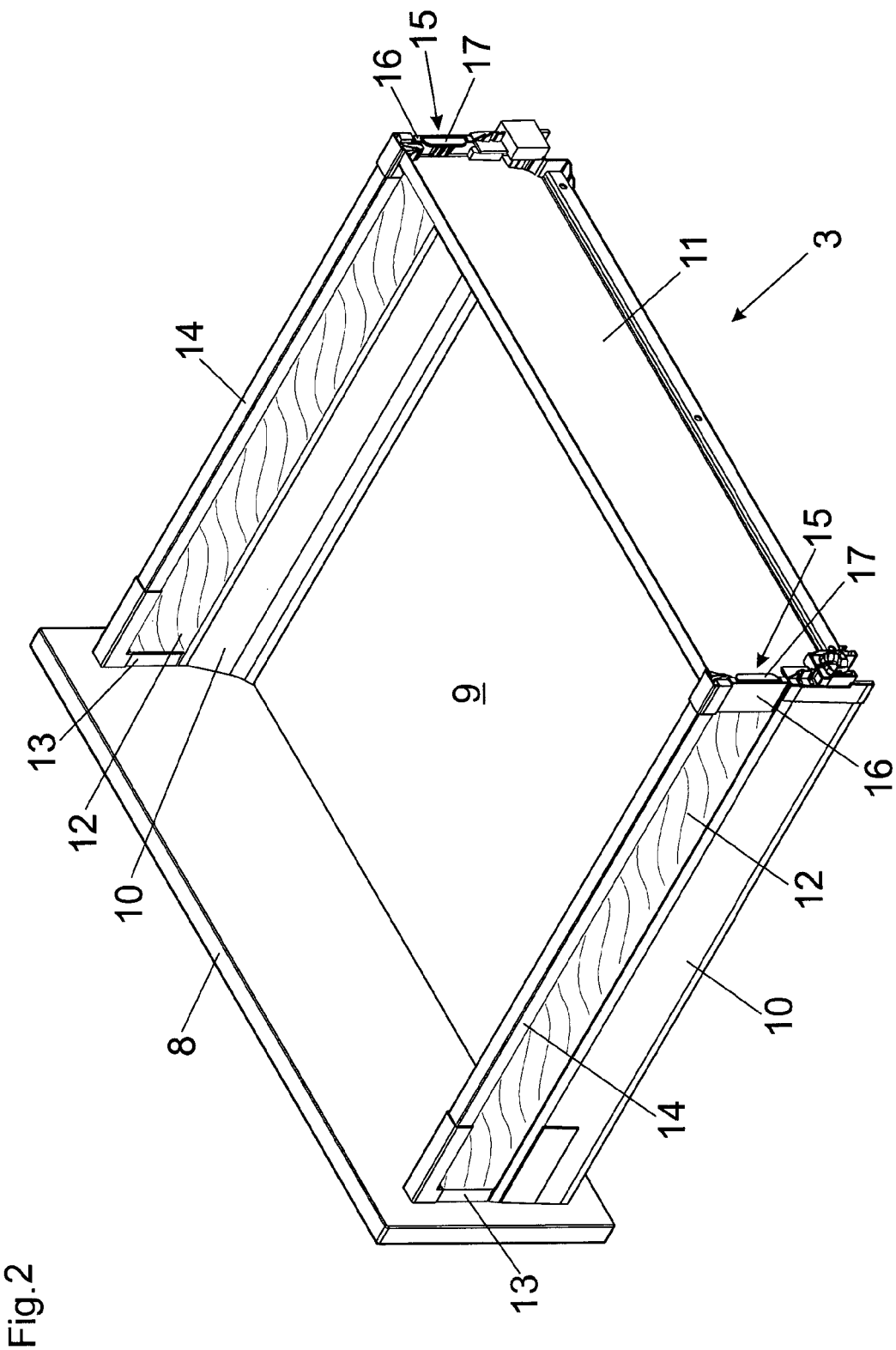
FIG. 2 shows a perspective view of a drawer.

FIG. 2 shows a perspective view from the rear of a drawer 3. The drawer 3 includes a front panel 8, a drawer bottom 9, side walls 10 and a rear wall 11. Arranged above the side walls 10 is a respective first drawer wall part 12 which, for example, is in the form of a plate-shaped insert of glass, wood, metal, plastic or ceramic. Railing struts 14 are arranged above the first drawer wall parts 12. Mounted to the front panel 8 is a fitment body 13 which has a recess (not visible here) for receiving the front end portion of the first drawer wall part 12. In contrast the rear end portion of the drawer wall part 12 is connected by way of the connecting apparatus 15 to the rear wall 11 which in the illustrated embodiment forms the second drawer wall part. The connecting apparatus 15 includes a receiving portion 16 with a receiving opening 20 (FIG. 3), in which the rear end portion of the drawer wall part 12 is inserted. The receiving portion 16 is fixed relative to the rear wall 11 by way of a clip 17 which can be inserted into the receiving portion 16 from the rear in a direction extending in the longitudinal direction of the drawer wall part 12, wherein the receiving portion 16 can be fixed in positionally secure relationship relative to the rear wall 11 by the clip 17.

Figure 3:
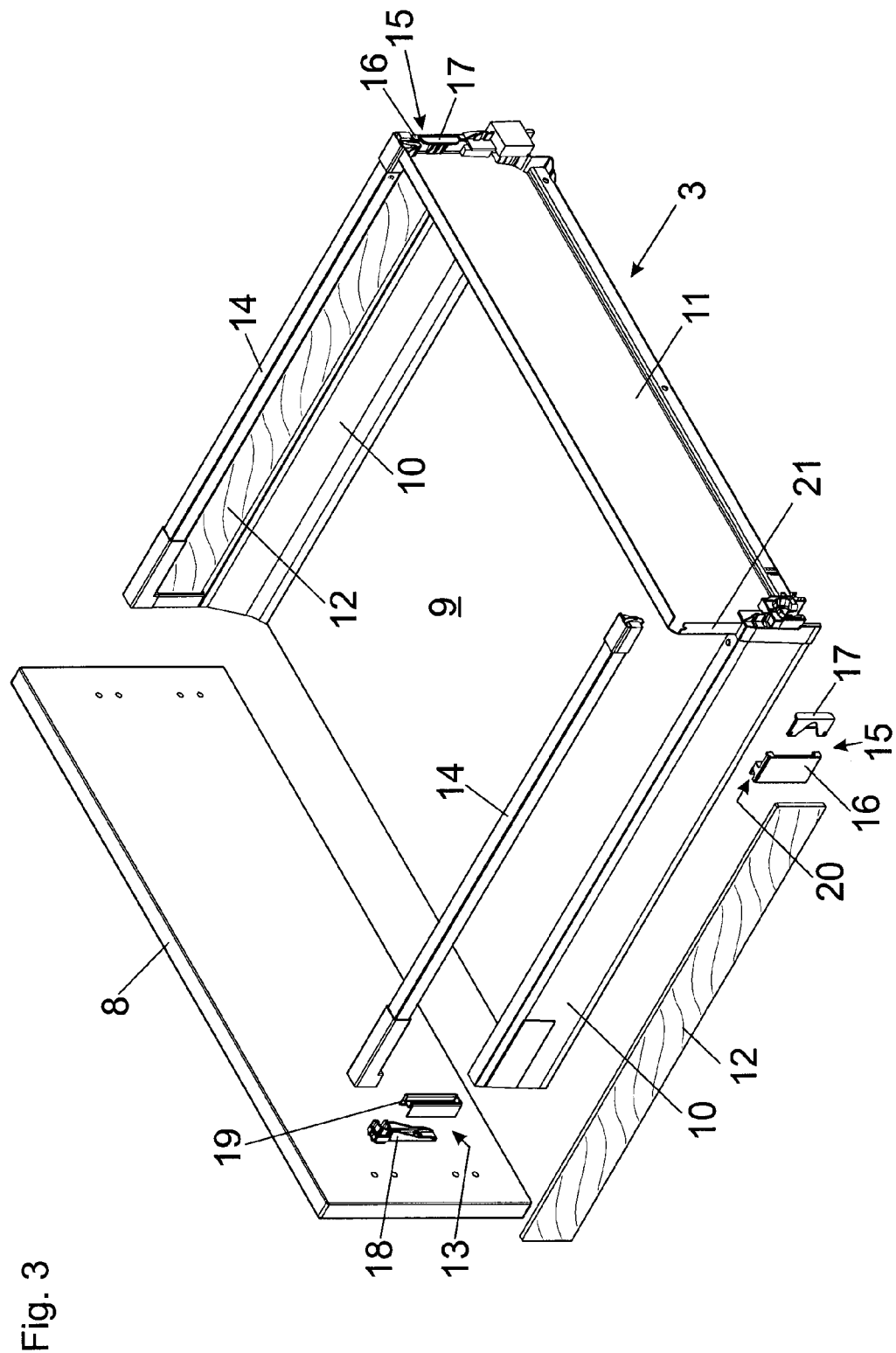
FIG. 3 shows the drawer of FIG. 2 with one side as an exploded view.

FIG. 3 shows a perspective view of the drawer 3, with one side of the drawer 3 being shown as an exploded view. A fitment body 13 is to be fitted at the rear side of the front panel 8, the fitment body 13 receiving the front end portion of the drawer wall part 12 and being adapted at the same time for fixing the front end of the railing strut 14. In the illustrated Figure, the fitment body 13 is of a two-part structure and includes a fixing portion 18 which is to be mounted to the front panel 8 and onto which a holder 19 can be snap-engaged. The holder 19 has a pocket-shaped recess for receiving the front end portion of the first drawer wall part 12. The side walls 10 of the drawer 3 are in the form of hollow profile members, preferably of metal or plastic. The connecting apparatus 15 includes a receiving portion 16 having a receiving opening 20 extending perpendicularly in the assembled position, for receiving the rear end portion of the drawer wall part 12. The receiving portion 16 can be fixed relative to a web 21 which is arranged or provided on the rear wall 11, by way of a clip 17. In the illustrated embodiment, the rear wall 11 is formed from a profile wall of metal or plastic, wherein the web 21 extends rearwardly at a right angle from the rear wall 11.

Figure 4:
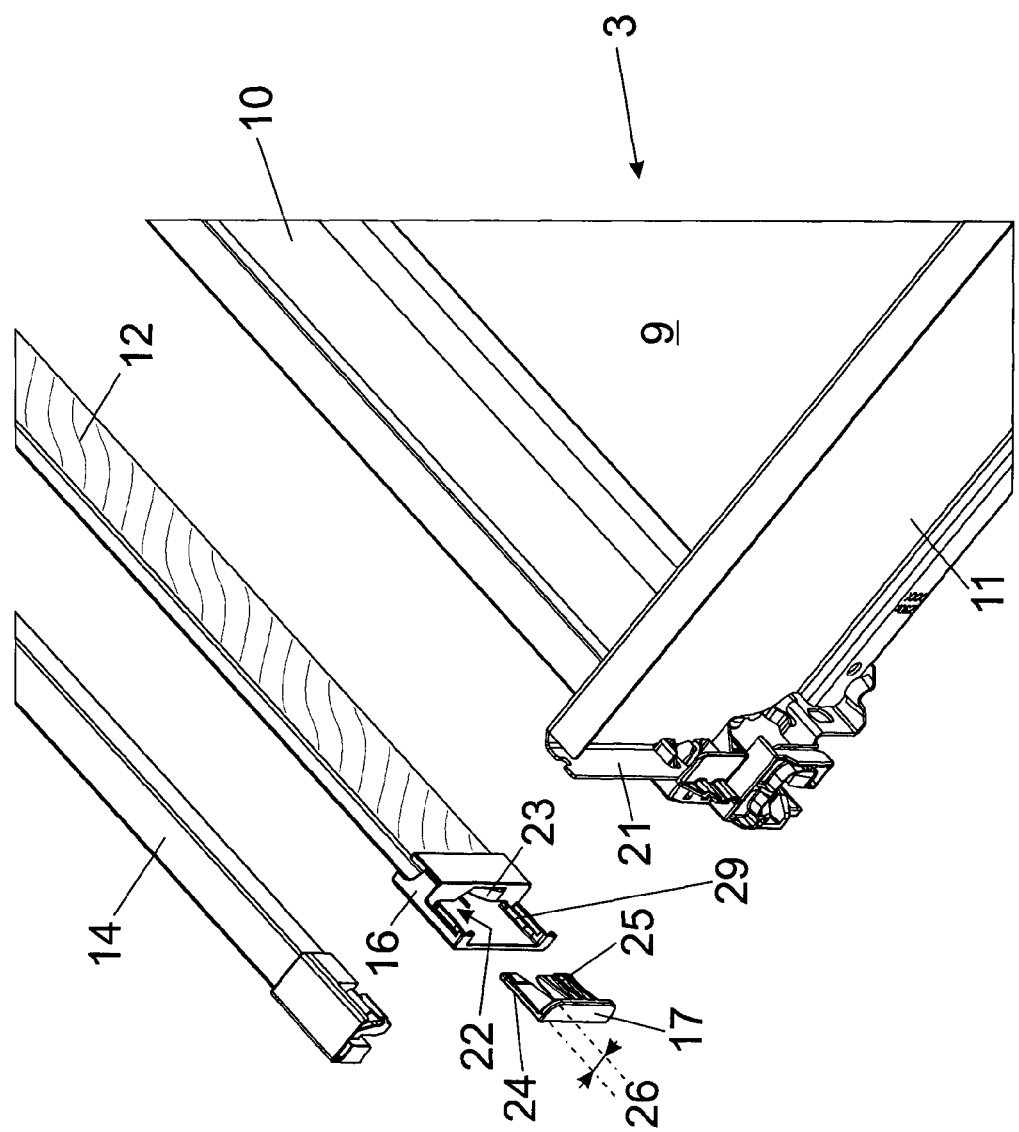
FIG. 4 shows an exploded view of the rear end region of the drawer.

FIG. 4 shows a perspective view from above of the rear end region of the drawer 3. It is possible to see the drawer 3 with the drawer bottom 9, the side wall 3 and the rear wall 11, from which the web 21 projects rearwardly. The receiving portion 16 is fitted onto the rearward end of the drawer wall part 12 so that the drawer wall part 12 is held in the receiving opening 20 (FIG. 3) of the receiving portion 16. The receiving portion 16 is provided with a resilient tongue 23 which, in the assembled condition, bears against an end of the drawer wall part 12, wherein longitudinal displacement of the drawer wall part 12 is prevented by the tongue 23 when the drawer 3 is pushed in or pulled out relative to the furniture carcass 2. The receiving portion 16 further includes an insertion opening 22 for receiving the clip 17. The clip 17 includes two mutually spaced limbs 24, 25, between which there remains a gap 26. The limb 24 of the clip 17 can be fitted into the insertion opening 22 of the receiving portion 12, while the other limb 25 of the clip 17 bears in the assembled condition against the inside of the web 21 so that the web 21 of the rear wall 11 is received in the assembled condition in the gap 26 formed between the limbs 24, 25. To facilitate introduction of the clip 17, there is provided an introduction funnel 29 having at least one inclined surface, by which the clip 17 can be guided into the insertion opening 22 in the receiving portion 16.

Figure 5A:
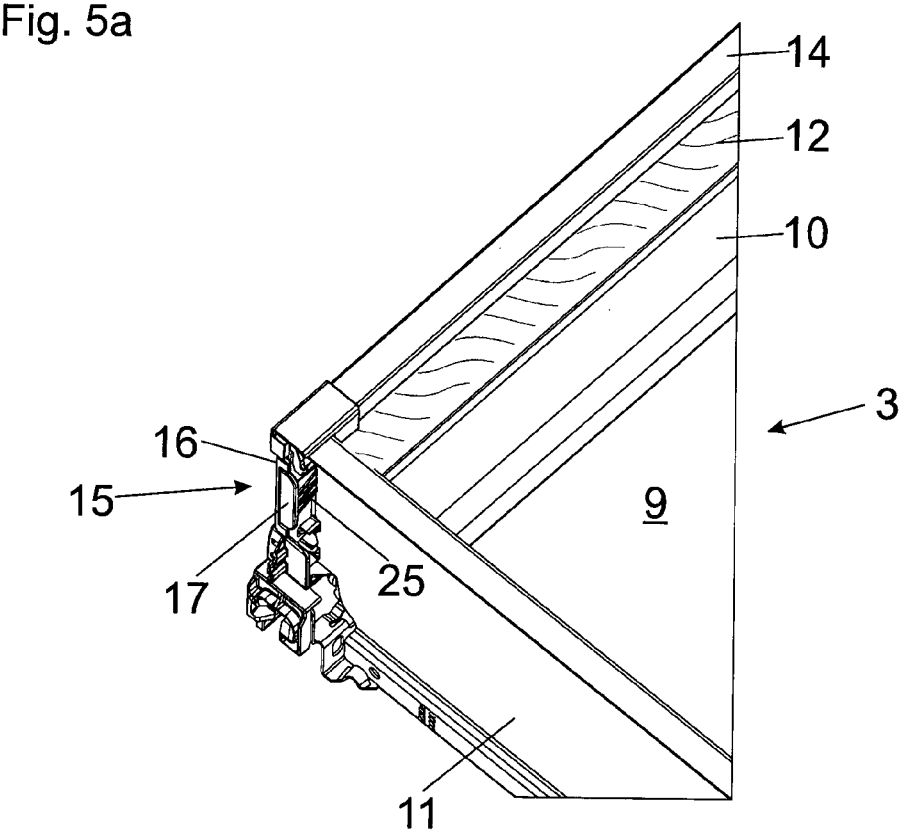
FIGS. 5a and 5b show cross-sectional views of the rear end region of the drawer with fitted drawer wall part and the connecting apparatus in the position of holding the drawer wall part.

FIG. 5a shows a perspective view from above of the rear end region of the drawer 3. It is possible to see the assembled position of the drawer wall part 12, wherein a limb 24 (FIG. 4) of the clip 17 is received in the insertion opening 22 of the receiving portion 16 and the other limb 25 of the clip 17 bears against the inside of the web 21 of the rear wall 11 so that the web 21 is held between the two limbs 24, 25 of the clip 17.

Figure 5B:
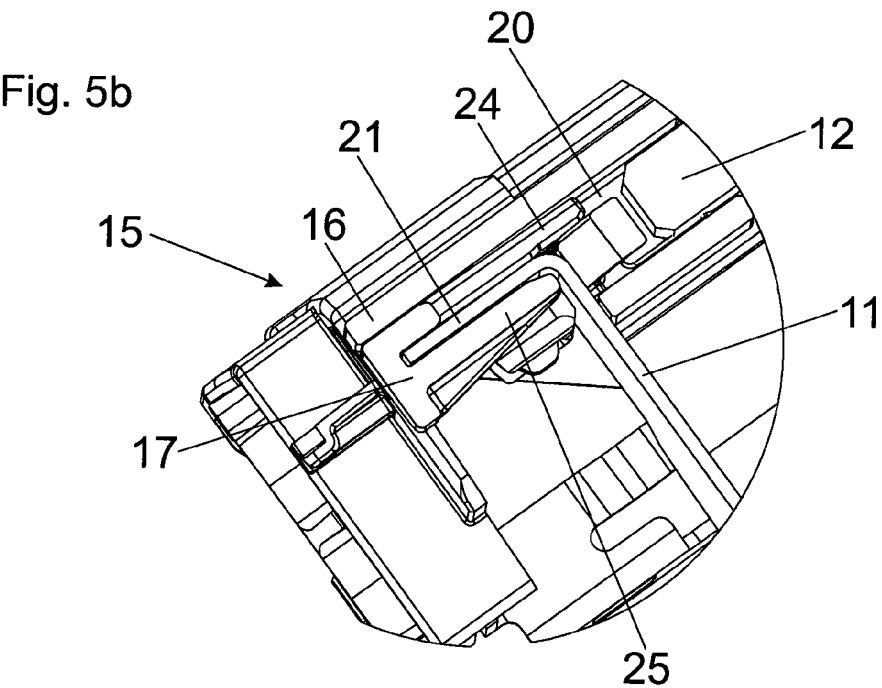

FIG. 5b shows a cross-sectional view of the connecting apparatus 15 in the position of holding the drawer wall part 12, wherein the rear end portion of the drawer wall part 12 is mounted in the receiving opening 20 in the receiving portion 16. A limb 24 of the clip 17 is fitted in the receiving portion 16, while the other limb 25 of the clip 17 bears against the angled web 21 of the rear wall 11 so that the web 21 is received between the two limbs 24, 25 of the clip 17.

FIG. 6a shows a perspective view of the clip 17, while FIG. 6b shows a plan view of the clip 17. The clip 17 has at least two mutually spaced limbs 24 and 25, between which there remains a gap 26. In the illustrated Figure, the limbs 24, 25 are of a differing length. It is possible to see a snap connection 27 with elastically bendable latching portions 28 which, in the position of holding the drawer wall part 12, are releasably latched to a predetermined fixing location of the receiving portion 16. The latching elements 28 can prevent unintentional release of the clip 17 relative to the receiving portion 16.

FIGS. 7a and 7b show the rear end region of the drawer 3 with the clip 17 in the released position and in the assembled position. The limb 24 has been inserted into the insertion opening 22 (FIG. 4) in the receiving portion 16, while the other limb 25 bears in the assembled position against the web 21 of the rear wall 11.

The present invention is not limited to the illustrated embodiment but includes or extends to all variants and technical equivalents which can fall within the scope of the appended claims. The positional references adopted in the description such as for example up, down, lateral and so forth are also related to the directly described and illustrated Figure and are to be appropriately transferred to the new position upon a change in position.

The invention claimed is:

1. An arrangement with at least two drawer wall parts to be connected at a right angle relative to each other and with a connecting apparatus for connecting the two drawer wall parts, wherein
    the connecting apparatus includes at least one receiving portion with at least one insertion opening, and wherein
    the connecting apparatus includes a clip having at least two limbs extending substantially parallel, wherein a first limb of the clip can be pushed into the at least one insertion opening of the at least one receiving portion and which connects the at least one receiving portion to the second drawer wall part in positionally secure relationship,
    wherein the at least one receiving portion has a receiving opening for receiving an end portion of the first drawer wall part and the clip for connecting the two drawer wall parts can be pushed onto a web protruding at a right angle from the second drawer wall part and wherein the two limbs of the clip embrace the web of the second drawer wall part.

2. The arrangement according to claim 1, wherein the receiving opening of the at least one receiving portion is in the form of a push-in pocket which, in an assembled condition, substantially completely embraces the end portion of the first drawer wall part.

3. The arrangement according to claim 1, wherein the at least one receiving portion has at least one introduction funnel by which a limb of the clip can be guided into the at least one insertion opening of the at least one receiving portion.

4. The arrangement according to claim 3, wherein the introduction funnel has at least one inclined surface which is provided on the at least one receiving portion and by which at least one limb of the clip can be guided in the direction of the at least one insertion opening of the at least one receiving portion.

5. The arrangement according to claim 1, wherein the at least one receiving portion has at least one resilient tongue which, in the assembled condition, bears against an end of the first drawer wall part.

6. The arrangement according to claim 1, wherein the clip can be connected releasably relative to the at least one receiving portion by at least one snap connection.

7. The arrangement according to claim 6, wherein at least one elastically bendable latching portion is disposed on the clip and is configured to be snap-engaged in position at a predetermined fixing location on the at least one receiving portion.

8. The arrangement according to claim 1, wherein the at least one receiving portion is made of plastic.

9. The arrangement according to claim 8, wherein the at least one receiving portion is a one-piece injection molding.

10. The arrangement according to claim 1, wherein the clip is made of plastic.

11. The arrangement according to claim 10, wherein the clip is a one-piece injection molding.

12. A drawer with a connecting apparatus according to claim 1.

13. The drawer according to claim 12, wherein a rear wall, a front panel or at least one side wall has a drawer wall part which is a plate-shaped insert, wherein the plate-shaped insert is connected to a profile wall by the connecting apparatus.

14. The drawer according to claim 13, wherein the drawer wall part comprises glass, plastic, wood, stone or a ceramic.

15. The drawer according to claim 13, wherein the profile wall comprises metal or plastic.

16. The drawer according to claim 12, wherein a rear wall, a front panel and at least one side wall have a drawer wall part which is a plate-shaped insert, wherein the plate-shaped insert is connected to a profile wall by the connecting apparatus.

17. The arrangement according to claim 1, wherein the clip can be pushed directly onto the web of the second drawer wall part.

18. The arrangement according to claim 1, wherein, in an assembled condition, the two limbs of the clip are in contact with the web of the second drawer wall part.

19. The arrangement according to claim 1, wherein, in an assembled condition, the web of the second drawer wall part is in between the two limbs of the clip.

20. The arrangement according to claim 1, wherein, in an assembled condition, the web of the second drawer wall part is in between a second limb of the clip and the first drawer wall part.

* * * * *